United States Patent
Frische-Mouri et al.

(10) Patent No.: US 9,810,344 B2
(45) Date of Patent: Nov. 7, 2017

(54) VALVE WITH LOCKING SLIDE

(71) Applicant: NIBCO Inc., Elkhart, IN (US)

(72) Inventors: Paul Frische-Mouri, Osceola, IN (US); David A. Bobo, Granger, IN (US); Matthew Krazit, Goshen, IN (US); Girish Kamble, Maharashtra (IN); John P. Andrejko, Charlotte, NC (US)

(73) Assignee: NIBCO INC., Elkhart, IN (US)

( * ) Notice: Subject to any disclaimer, the term of this patent is extended or adjusted under 35 U.S.C. 154(b) by 57 days.

(21) Appl. No.: 15/046,615

(22) Filed: Feb. 18, 2016

(65) Prior Publication Data

US 2017/0241565 A1    Aug. 24, 2017

(51) Int. Cl.
| F16K 35/00 | (2006.01) |
| F16K 35/02 | (2006.01) |
| F16K 5/06 | (2006.01) |
| F16K 31/60 | (2006.01) |

(52) U.S. Cl.
CPC .............. *F16K 35/025* (2013.01); *F16K 5/06* (2013.01); *F16K 31/60* (2013.01)

(58) Field of Classification Search
CPC .......... F16K 35/025; F16K 31/60; F16K 5/06; F16K 35/022; F16K 35/06
USPC .............. 251/90, 92, 93, 91, 315.1; 137/385
See application file for complete search history.

(56) References Cited

U.S. PATENT DOCUMENTS

| 195,611 A | 9/1877 | Jarecki |
| 1,139,208 A | 5/1915 | McMurray |
| 1,437,369 A | 11/1922 | Tallman |
| 3,648,970 A | 3/1972 | Hartmann et al. |
| 3,679,170 A | 7/1972 | Bernas et al. |
| 4,126,023 A * | 11/1978 | Smith ..................... F16K 35/06 137/385 |
| 4,208,033 A | 6/1980 | Kesterman |
| 4,756,507 A | 7/1988 | McAndrew |
| D297,354 S | 8/1988 | Wirth |
| 5,014,528 A * | 5/1991 | Roberts ................... F16K 35/06 137/385 |
| 5,115,834 A * | 5/1992 | Champagne ............ F16K 35/06 137/385 |
| 5,139,041 A | 8/1992 | Albrecht |

(Continued)

FOREIGN PATENT DOCUMENTS

| CN | 101709791 | 5/2010 |
| CN | 201487368 | 5/2010 |

(Continued)

*Primary Examiner* — Craig Schneider
*Assistant Examiner* — Andrew J Rost
(74) *Attorney, Agent, or Firm* — Price Heneveld LLP

(57) ABSTRACT

A valve system includes a spring-biased locking slide plate which extends in an axial direction parallel to and offset from the axis of the valve stem and selectively extends through a base plate mounted to the top of a valve to selectively engage stop tabs on the valve body. The locking slide plate also extends through the valve handle and through a locking member to selectively lock the valve in open or closed positions. In one embodiment, the locking slide plate comprises two sections which include a lower section having tines which selectively engage tabs on the valve body and a second upper section which is spring-biased to the lower section to float to allow the lower section to accommodate different diameter valve bodies.

20 Claims, 11 Drawing Sheets

(56) References Cited

U.S. PATENT DOCUMENTS

| | | | |
|---|---|---|---|
| 5,165,263 | A | 11/1992 | Perron et al. |
| 5,213,308 | A | 5/1993 | Jeromson et al. |
| 5,236,006 | A | 8/1993 | Platusich et al. |
| D358,455 | S | 5/1995 | Kieper |
| 5,427,135 | A | 6/1995 | Kieper |
| 5,579,804 | A * | 12/1996 | Roberts .................. F16K 35/06 137/385 |
| 5,709,112 | A * | 1/1998 | Kennedy ............... F16K 35/025 137/385 |
| 5,785,074 | A | 7/1998 | Kieper |
| 7,044,148 | B2 | 5/2006 | Berger et al. |
| 8,205,859 | B2 | 6/2012 | Teague, Jr. |
| 8,740,180 | B2 | 6/2014 | Matsushita et al. |
| 9,297,477 | B2 | 3/2016 | Yoder |

FOREIGN PATENT DOCUMENTS

| | | |
|---|---|---|
| CN | 201763994 | 3/2011 |
| CN | 203223586 | 10/2013 |

\* cited by examiner

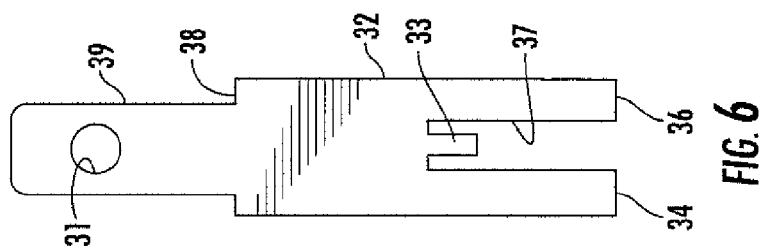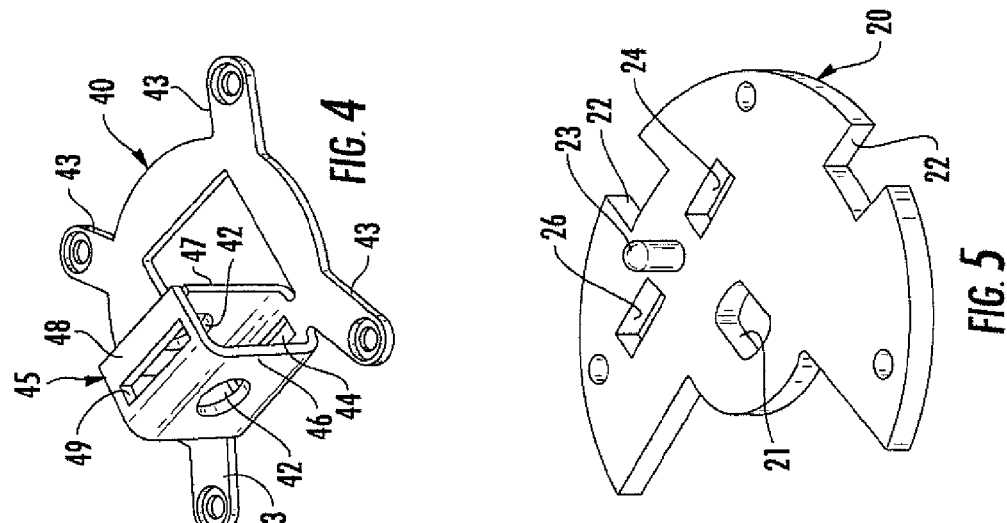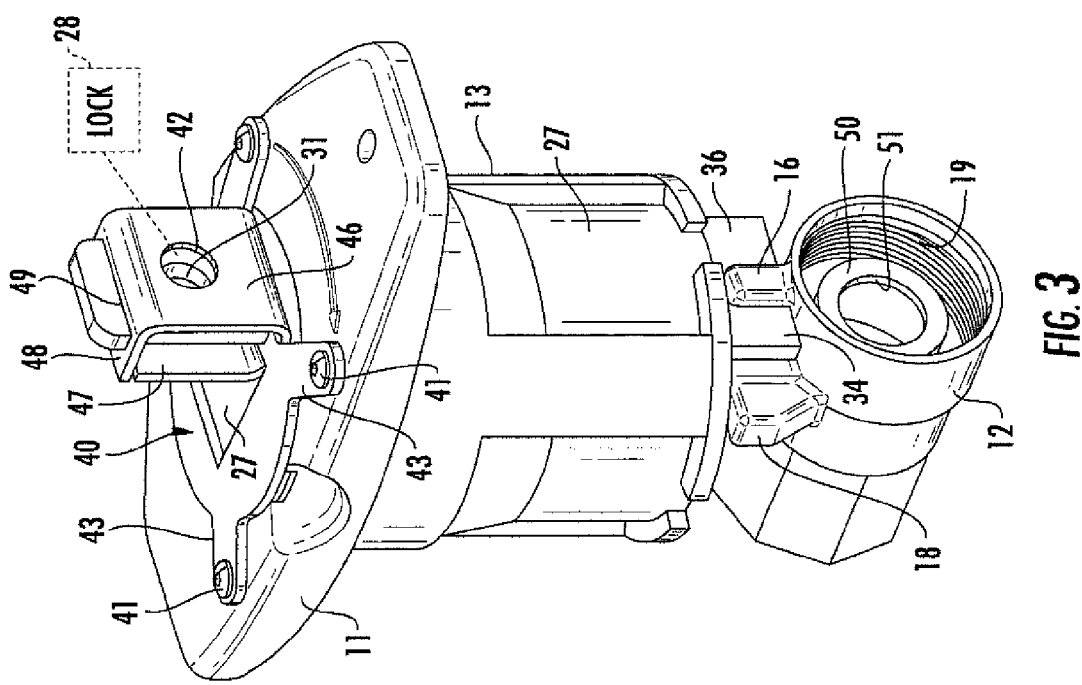

VALVE WITH LOCKING SLIDE

BACKGROUND OF THE INVENTION

The present invention relates to valves and particularly to a valve handle which can selectively lock the valve in open or closed positions with a locking slide.

Valves, and particularly ball valves, typically have stops for controlling the handle between fully open and fully closed positions while still allowing intermediate positions, if desired. In most applications, the valve is left in one of a fully open or fully closed position. In most installations, it is undesirable to inadvertently change the selected fully open or fully closed position. Prevention of inadvertent movement of the valve can be accomplished in a number of ways, including, for example, valve handle locks, such as disclosed in U.S. Pat. Nos. 5,427,135; 5,785,074; and D 358,455, in which locking rings or tabs are positioned to engage a valve handle and include apertures which permit a lock, such as a padlock, to be inserted between the locking member and the handle to prevent tampering with the valve when in a selected position. Allowed US Patent Publication No. 2015/0101684 entitled VALVE HANDLE LOCK, filed on Oct. 3, 2014, discloses yet another valve lock which provides the additional feature of allowing the valve to be held in a fixed position without locking or to prevent inadvertent motion of the valve. It also allows a padlock to be inserted to prevent tampering with the valve.

Some valves employed in connection with pipe systems carrying hot or cold fluids are insulated and, to accommodate the insulation, cylindrical extensions between the valve handle and the valve body are employed. An example of such a valve is a ball valve which has been sold for many years by NIBCO Inc. of Elkhart, Ind., under the trademark NIB-SEAL®. Due to the unique construction of such valves, they pose a significantly more difficult challenge in order to provide locking mechanisms without interfering with the insulated valve body and pipes to which the valves are connected.

SUMMARY OF THE INVENTION

The valve system of the present invention provides the ability to lock an insulated valve by providing a locking slide plate which extends in an axial direction parallel to and offset from the axis of the valve stem and selectively extends through a base plate mounted to the top of a valve to selectively engage stop tabs on the valve body. The locking slide plate also extends through the valve handle and through a locking member associated with the valve handle to selectively lock the valve in open or closed positions.

In a preferred embodiment, the locking slide plate has spaced-apart tines at its lower end which can selectively span the stop tabs on the valve body and includes a bias spring which urges the locking slide plate toward an unlocked position. In another embodiment, the locking slide plate comprises two sections which include a lower section having tines which selectively engage tabs on the valve body and a second upper section which is spring-biased to the lower section to float to allow the lower section to accommodate different diameter valve bodies and allow the upper section to lock to the locking member.

In each embodiment, a shoulder on the locking slide plate captively holds the locking slide plate between the valve body and handle. The locking slide plates of either embodiment include an aperture which aligns with an aperture in the locking member, which can be an upper valve plate attached to the valve handle, when the locking slide plate is depressed against the spring pressure to align the locking apertures, such that a lock can be inserted between the locking slide plate and the upper valve plate to lock the valve in a selected open or closed position.

Such a design, therefore, allows a valve which may be installed in an insulated environment and employs an extended handle for such purpose to be locked in open or closed positions, utilizing a minimum of parts and provides reliable operation in such an environment. These and other features, objects and advantages of the present invention will become apparent upon reading the following description thereof together with reference to the accompanying drawings.

BRIEF DESCRIPTION OF THE DRAWINGS

FIG. 3 is a perspective view of the valve shown in FIG. 1, shown in the locked position with the valve open;

FIG. 4 is a perspective view of the top valve plate;

FIG. 5 is a perspective view of the base plate of the valve assembly;

FIG. 6 is a front elevational view of the locking slide plate incorporated in the valve shown in FIGS. 1-3;

DETAILED DESCRIPTION OF THE PREFERRED EMBODIMENTS

Figure 1:
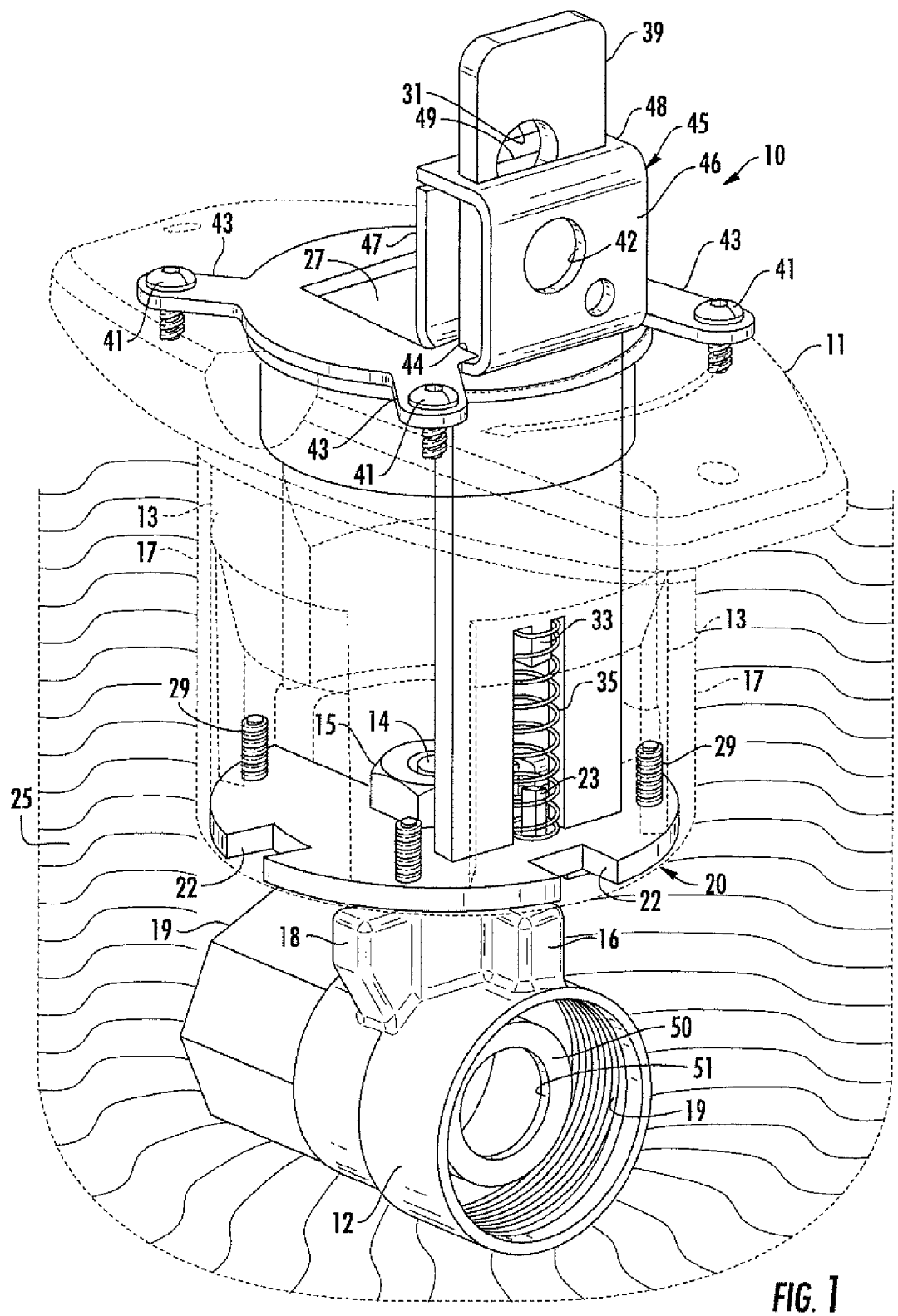
FIG. 1 is a perspective view, partly in phantom form, of a first embodiment of a valve embodying the present invention, shown with the valve open and in an unlocked position.

Referring initially to FIG. 1, there is shown a valve installation for a hot or cold fluid system which includes a valve assembly 10 which, in the embodiment shown, is a ball-type valve having a valve body 12. The ball valve can be of generally conventional construction, including a ball 54 (FIGS. 12-14) with a valve seat 50 and a passageway 51. The ball rotates within the body of the valve 12 between open and closed positions to allow or stop the flow of fluid through the valve. Extending upwardly from the valve body is a valve stem 14 which is keyed to an aperture 21 (FIG. 5) in a valve base plate 20 and secured thereto by a lock nut 15. Valve body 12 includes a pair of orthogonally aligned tabs 16 and 18 which align with the locking mechanism of the present invention to selectively lock the valve in an open position, as seen in FIG. 1, or rotated 90° to align with tab 18 to selectively lock the valve in a closed position. The valve assembly includes a handle 11 with a cylindrical extension 13 which engages the base plate to rotate the ball 54. Extension 13 also positions the handle 11 in spaced relationship to the valve body 12.

In environments where the valve assembly 10 is employed with hot or cold fluids, such as in an HVAC system, the cylindrical extension 13 extends between valve handle 11 and base plate 20 to which the extension is fixedly secured by interlocking tabs on member 13 and slots 22 on plate 20 and fastening screws 29. A floating cylindrical sleeve 17 typically surrounds the valve handle extension 13 to provide an interface between fixed insulation 25 surrounding the valve and the movable valve handle 11 and extension 13. This allows the valve handle to move without disturbing the surrounding insulation 25. An cap 27 fills the cylindrical extension 13 of the valve handle and has suitable apertures allowing for freedom of movement of the locking assembly described below. The body of the ball valve can include any type of interconnection with fluid conduits (not shown) including, for example, threaded socket 19 at each end of the valve, as illustrated in FIG. 1.

Figure 2:
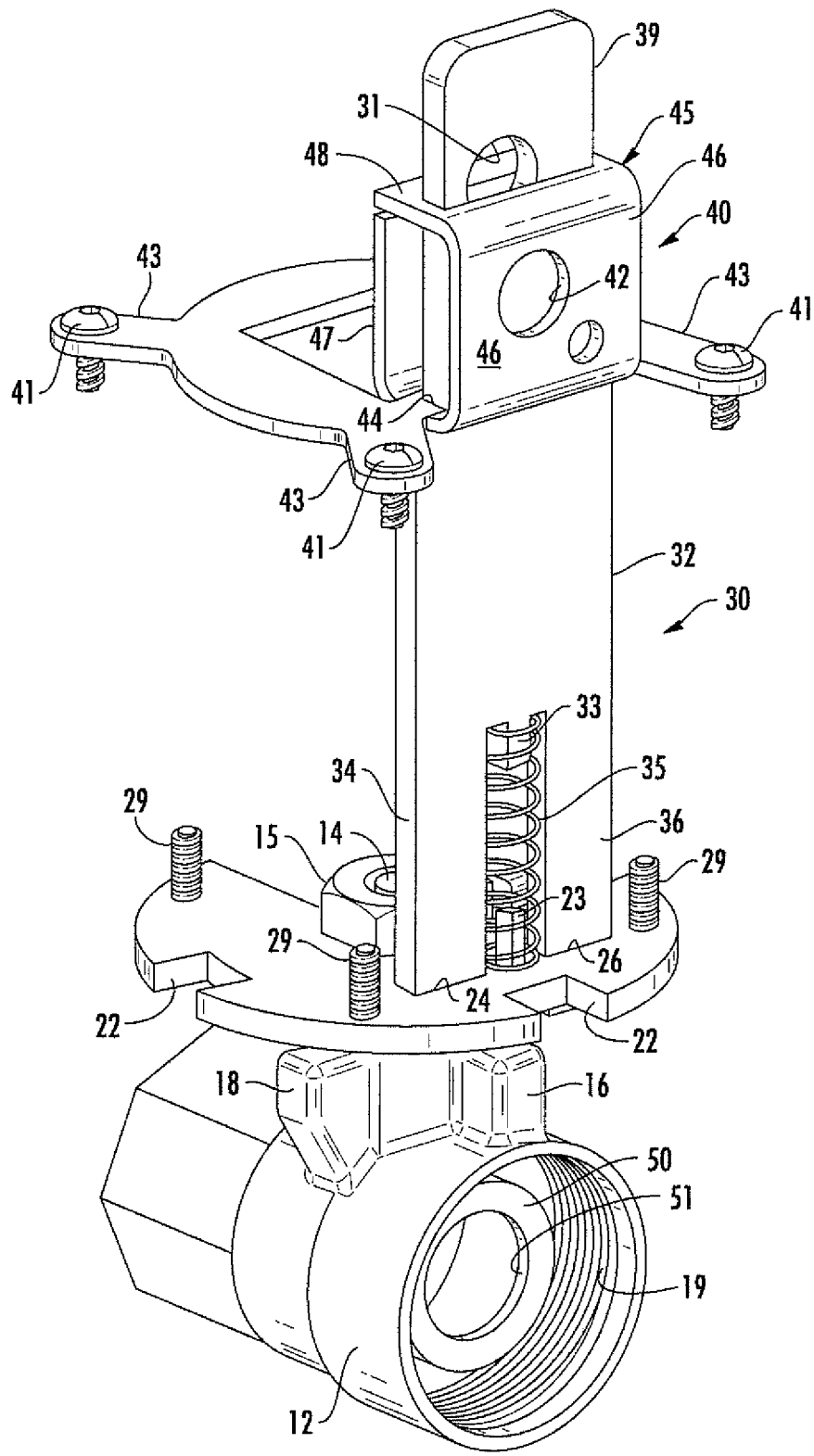
FIG. 2 is a perspective view of the locking components of the valve shown in FIG. 1.

The handle 11 of the valve assembly 10 can be locked in open or closed positions by the unique locking system now described in detail in connection with FIGS. 2-6. The locking assembly 30 includes a locking slide plate 32 which, as seen in FIG. 6, includes a pair of spaced-apart tines 34 and 36 which extend through slots 24 and 26, respectively, in the base plate 20 and over one of the locking tabs 16 or 18 of the valve body 12, as seen, for example, in FIG. 3, when the valve is in a locked open position and the locking slide plate 32 is lowered. Locking slide plate 32 is biased to an unlocked position, as seen in FIGS. 1 and 2, by a spring 35 which extends over a post 23 extending upwardly from the base plate 20 to position the lower end of spring 35 with respect to the base plate. The upper end of spring 35 surrounds and is captively held by a tab 33 centered in the slot 37 between tines 34 and 36. The locking slide plate 32 includes a pair of shoulders 38 with an upwardly extending leg 39 including an aperture 31 for receiving a lock when it is desired to lock the valve in an open or closed position. The shoulders 38 captively hold locking slide plate 32 in the valve body by engaging the underside of top plate 40 adjacent slot 44 (FIG. 4). The spring 35, as seen in FIG. 2, urges the locking slide plate 32 toward an unlocked position with leg 39 extending through a top valve plate 40. Plate 40 is secured to the top surface of valve handle 11, as illustrated in FIG. 1 by means of a plurality of fasteners 41 at the corners of the outwardly extending mounting tabs 43 of valve plate 40. The valve plate 40 defines a locking member associated with the valve handle. The valve handle may, however, integrally include the structure of valve plate 40 to achieve the locking valve assembly of this invention.

The top valve plate 40, as best seen in FIG. 4, includes a slot 44 through which the leg 39 of locking slide plate 32 extends and through an upwardly extending formed locking box 45 consisting of legs 46 and 47, an upper wall 48 with a slot 49 aligned with slot 44. The legs 46 and 47 each include an aperture 42 which aligns with aperture 31 in the locking slide plate when it is pushed downwardly against bias spring 35, as shown in FIG. 3. In this position, the tines 34 and 36 surround the locking tab 16 (shown in the valve locked open position). The aperture 31 and locking slide plate align with the apertures 42 in the top valve plate 40 to allow a lock, such as a padlock 28 (shown schematically in FIG. 3), to be positioned through the aligned apertures for locking the valve in position.

In operation, the locking slide plate 32 normally is biased to an unlocked position, as shown in FIGS. 1 and 2, by spring 35, such that the tines 34 and 36 do not extend below the slots 24 and 26 of plate 20 and, therefore, allow the handle 11 to be rotated from the open position aligned with tab 16 to a 90° rotated closed position whereby the tines 34 and 36 would be aligned with tab 18. In either position, the end of leg 39 can be pressed downwardly against the bias spring 35 and the lock inserted through apertures 31 in the locking slide plate 32 and apertures 42 in the top plate 40 for locking the valve in a selected open or closed position. This embodiment works well for a given diameter of the valve body 12 and the length of locking slide plate 32 can be selected to accommodate different valve body diameters.

A universal compound locking slide plate, however, is disclosed in the second embodiment, which is independent of the diameter of valve bodies and now described in connection with FIGS. 7-14. In the alternative embodiment illustrated in FIGS. 7-14, the same part numbers used for the first embodiment of FIGS. 1-6 are employed for the valve body, valve handle, extension, and the top plate. The primary difference is the use of a compound locking mechanism 130 including two separate sliding plates 140 and 150 and two bias springs 145, 170 as compared to the first embodiment.

Figure 7:
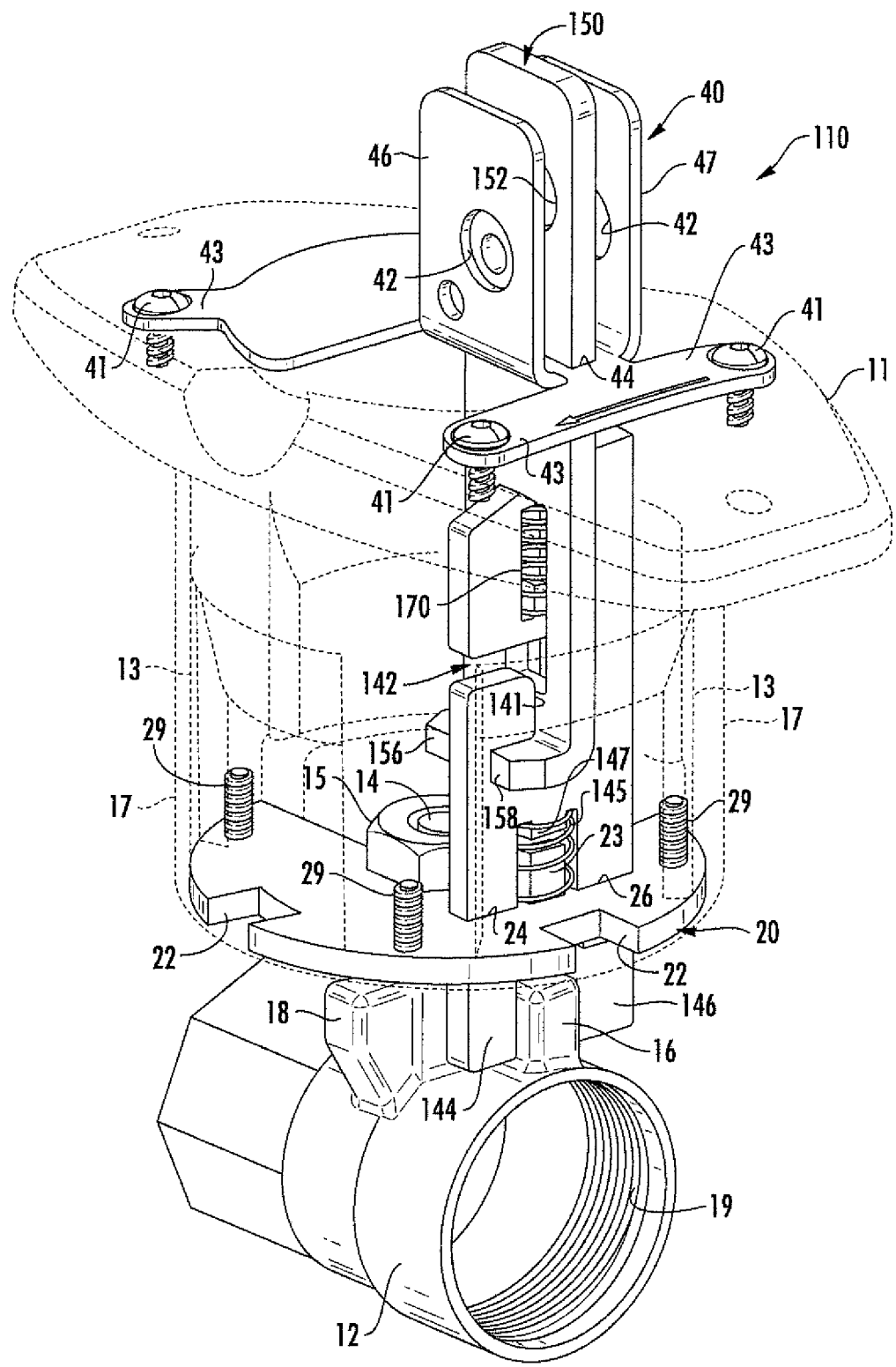
FIG. 7 is a perspective view of an alternative embodiment of the valve shown, partly in phantom form and in a locked valve open position.

The valve assembly 110 shown in FIG. 7 includes the same handle 11 as in the first embodiment, and a similar top plate 30 attached to the upper surface of valve handle 11 by fasteners 41. The only difference in the top plate 30 is that it is formed with U-shaped upward legs 46 and 47, each having an aperture 42 aligned with one another for receiving the lock (such as lock 28 of FIG. 3) between the top valve plate 40 and the locking mechanism now described.

Figure 8:
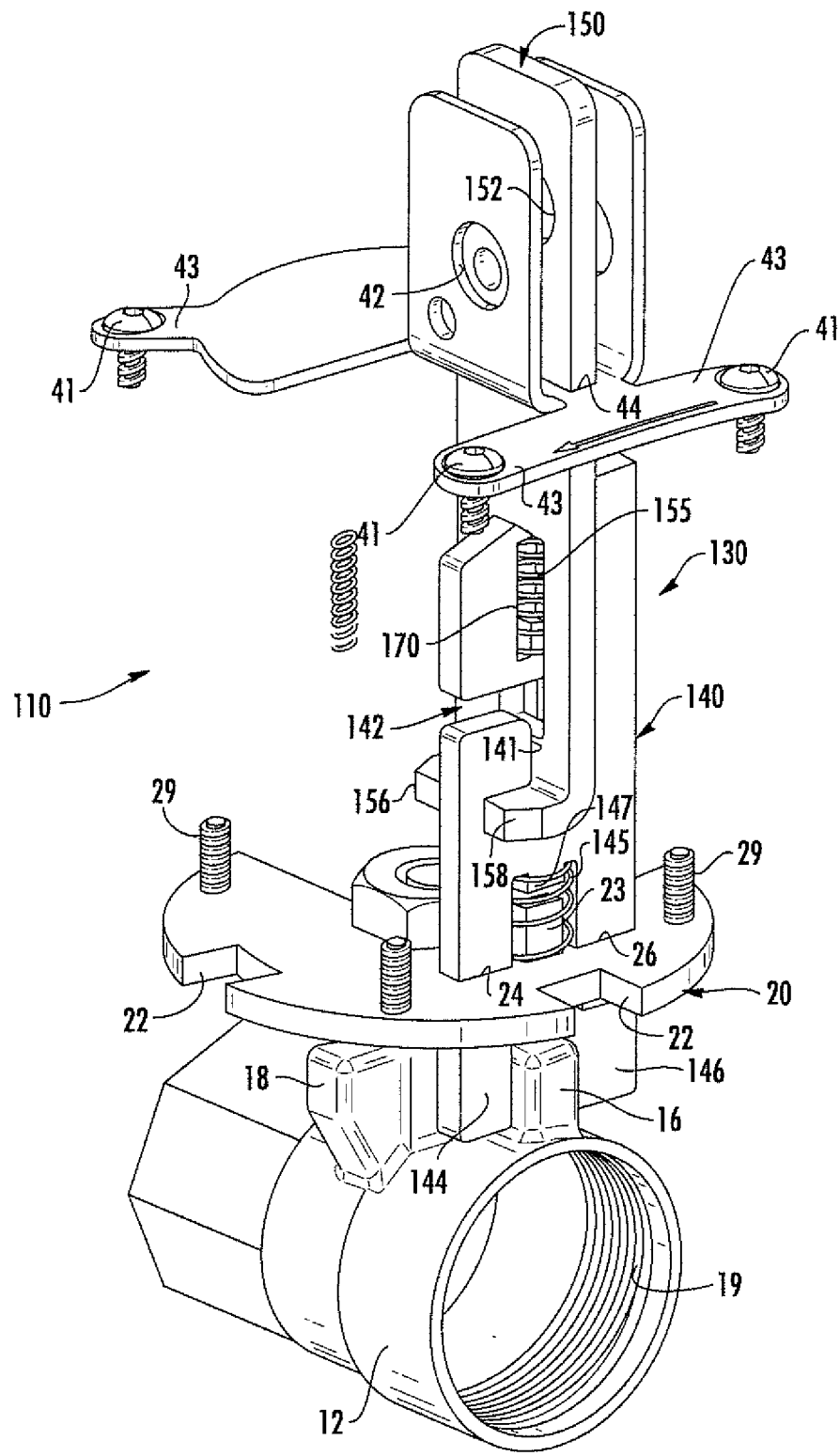
FIG. 8 is a perspective view of the valve body and the locking mechanism associated with the valve body.
Figure 9:
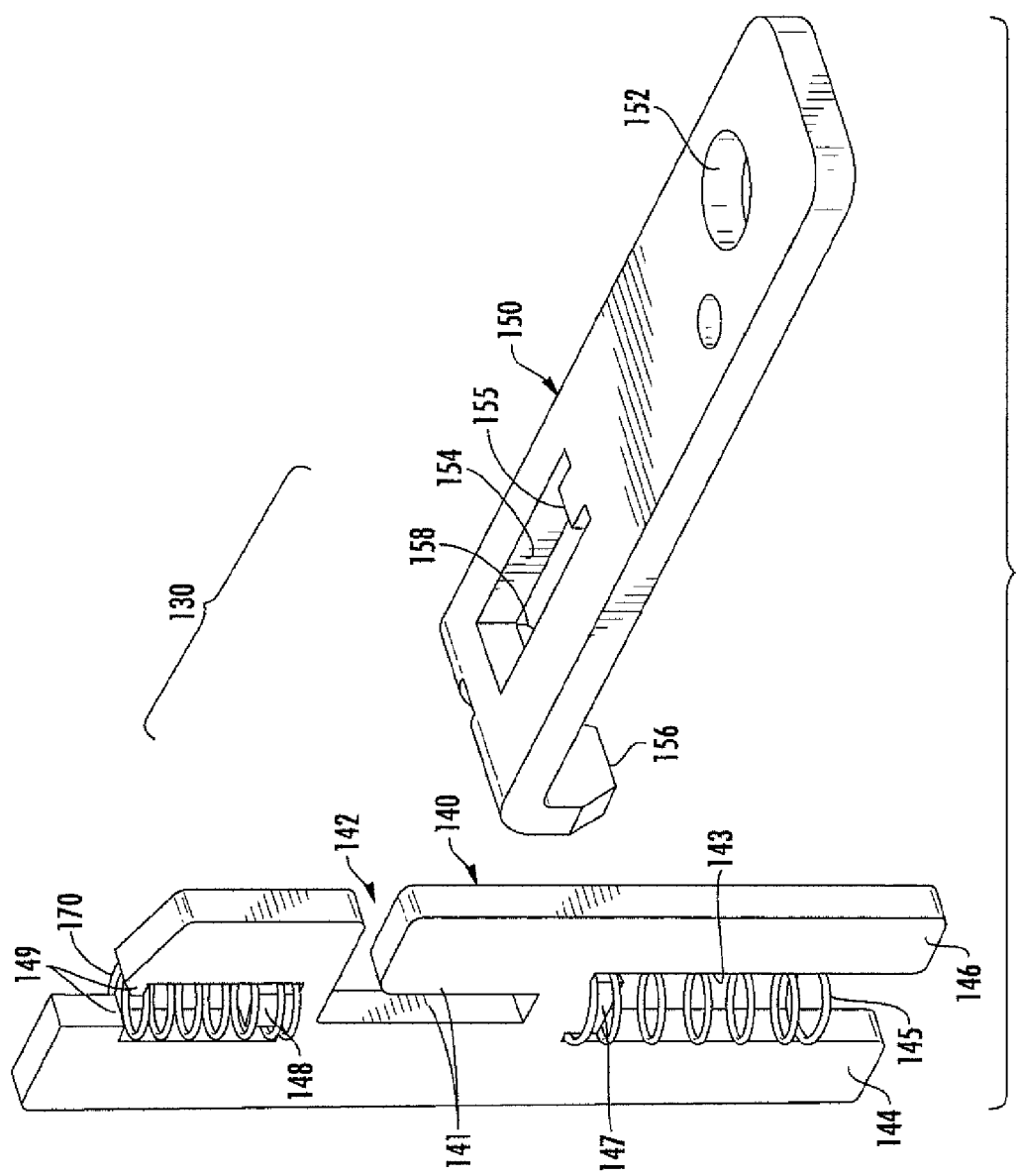
FIG. 9 is a perspective view of the components of the compound locking slide plate shown in FIG. 7.
Figure 10:
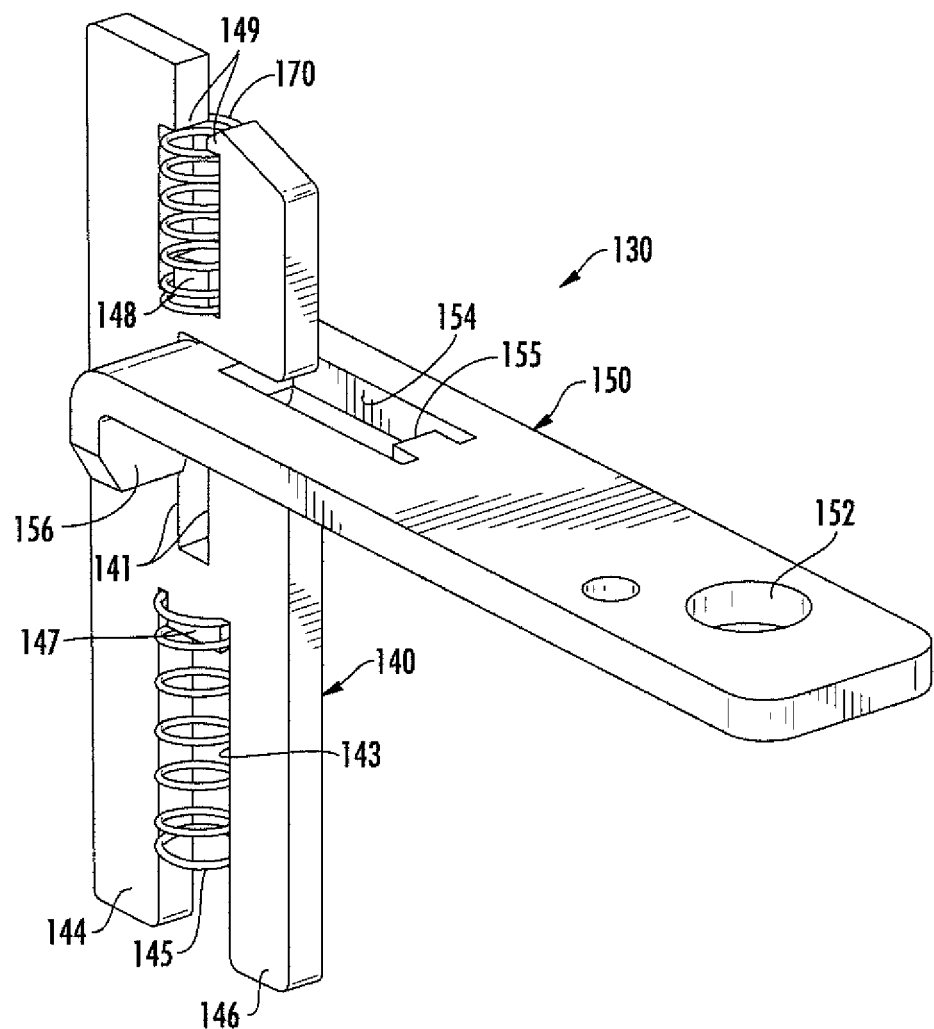
FIG. 10 is a perspective view of the components shown in FIG. 9 during the assembly process.
Figure 11:
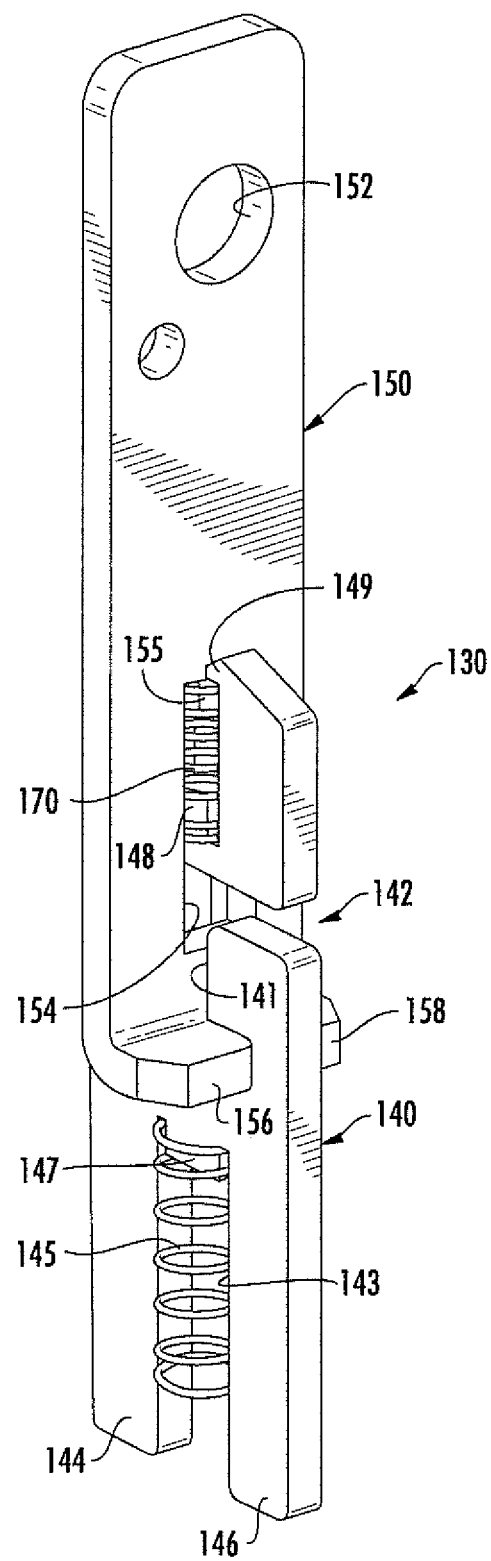
FIG. 11 is a perspective view of the components of the locking slide plate shown assembled.

The locking mechanism 130 is best seen in FIG. 8 and includes a lower locking slide plate 140 and an upper locking slide plate 150, which are interconnected to one another, as illustrated in the assembly views of FIGS. 9-11. The upper slide plate 150 and lower slide plate 140 are generally rectangular plates with plate 150 extending through slot 44 in top plate 40, as seen in FIG. 7. Plate 150 includes an aperture 152 which aligns with apertures 42 of the top plate 40, such that the sliding locking mechanism 130 can be locked into a locking position, as shown in FIGS. 7 and 8. Slide plate 150 includes a rectangular opening 154 at an end opposite the locking aperture 152 and includes orthogonally angled pairs of spaced tines 156 and 158 which guidably support slide plate 150 in its sliding movement with respect to the lower slide plate 140. Adjacent opening 154 is a tab 155 which aligns with and engages the upper end of spring 170 between plates 140 and 150, as best seen in FIG. 11.

The lower slide plate 140 includes a pair of tines 144 and 146 which span the locking tabs 16 and 18 of valve body 12 when in a lowered locked position. A second bias spring 145 urges the lower locking slide plate 140 (and the connected upper slide plate 150) away from the locking position. Spring 145 is captively held in slot 143 between tines 144 and 146 and fits over tab 147 at the upper end of slot 143. The lower end of spring 145 is captively held by the upwardly extending pin 23 in base plate 20, as seen in FIG. 7. Slide plate 140 includes an inverted L-shaped slot 142 which receives the tines 156 and 158 on the end of slide plate 150, as seen in FIGS. 10 and 11, with the tines 156, 158 sliding on opposite sides of plate 140 along the vertical section 141 of slot 142. Spring 170 is captively held to the upper end of plate 140 by a tab 148 at the lower end of slot 142 and spring 170 and by inwardly projecting shoulders 149 at the top of slot 142 and spring 170. When sliding plates 140 and 150 are assembled as seen in FIGS. 7, 8, and 11, tab 155 of the sliding plate extends into and engages the upper end of spring 170. When connected, plates 140 and 150 define a compressible compound locking slide mechanism 130. The spring constant of spring 170 is selected to be slightly greater (i.e., a stiffer spring) than the bias spring 145, such that depression of the upper locking slide plate 150 will force the lower slide plate 140 into a locking position surrounding one of the tabs 16 or 18 of the valve.

Figure 12:
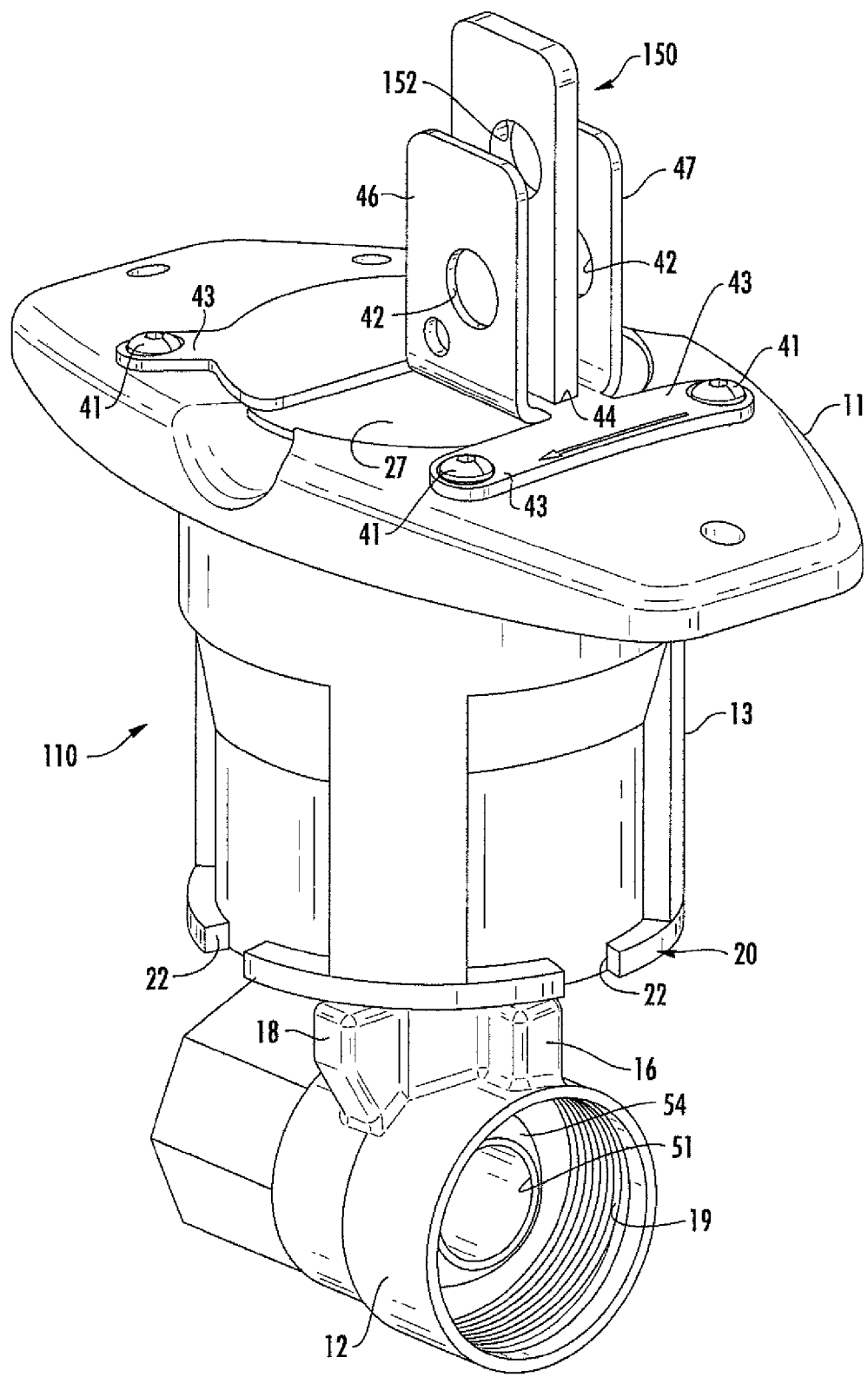
FIG. 12 is a perspective view of the valve assembly, shown in an unlocked valve open position.
Figure 13:
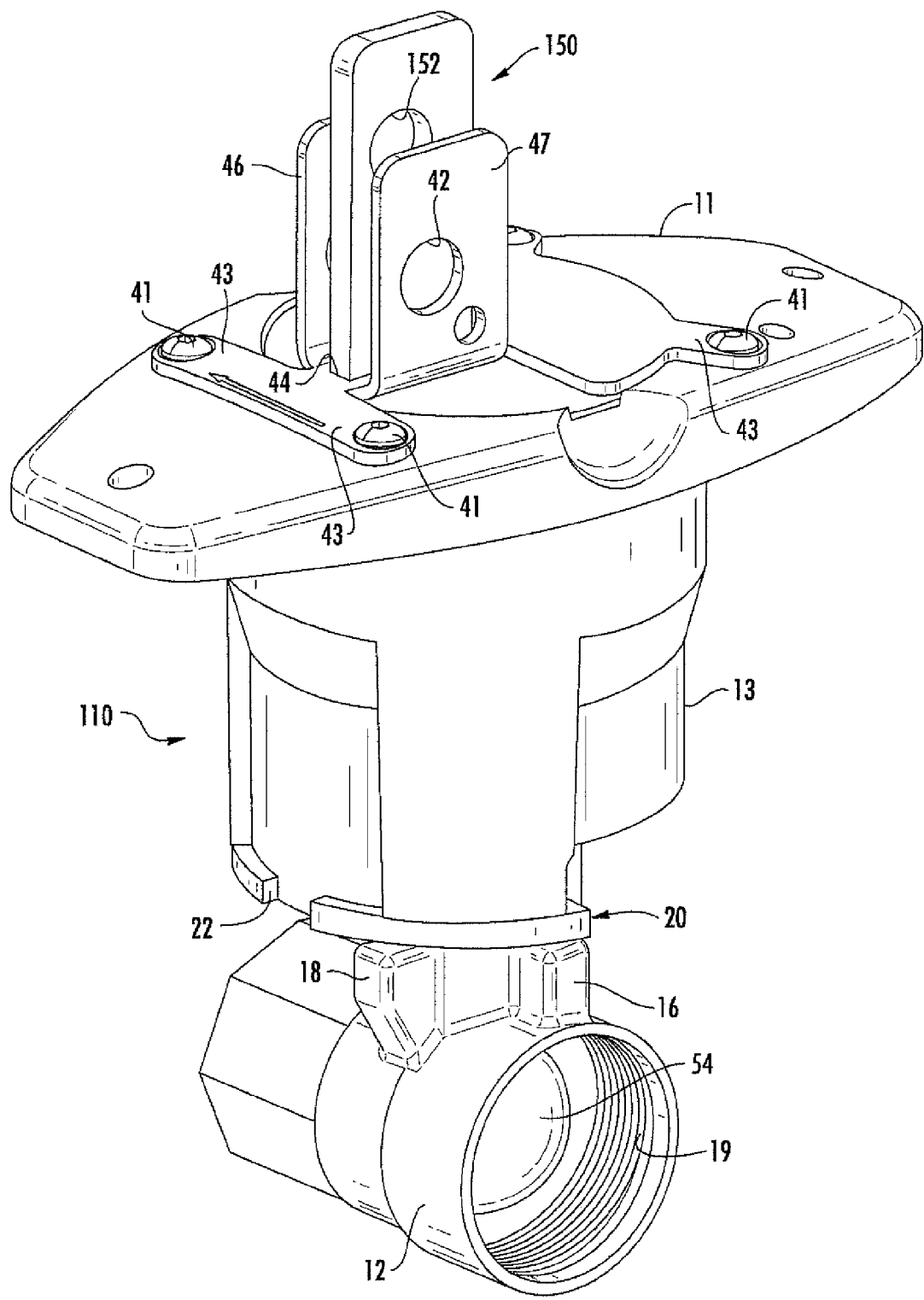
FIG. 13 is a perspective view of the valve of FIG. 12 shown in an unlocked valve closed position.
Figure 14:
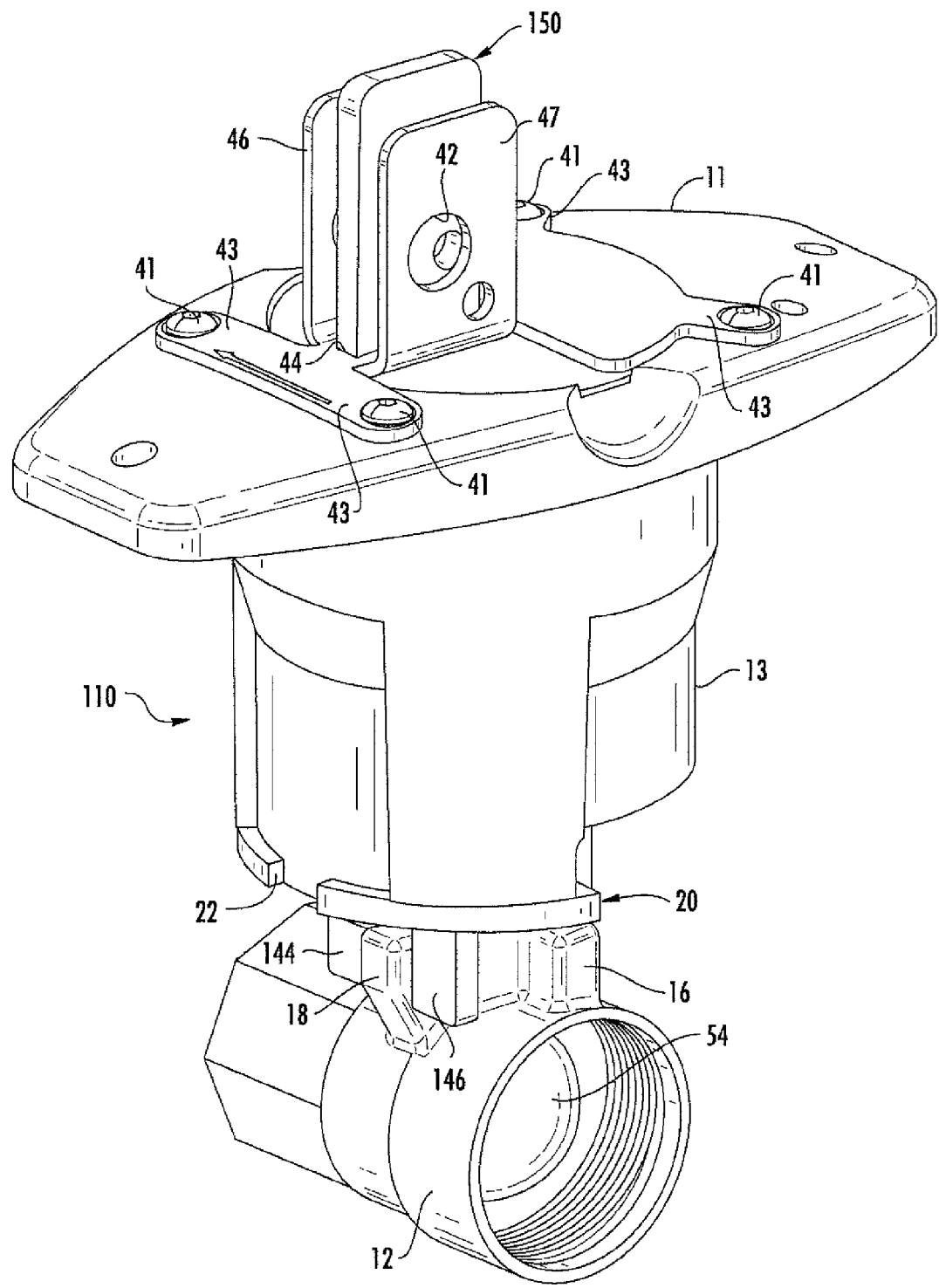
FIG. 14 is a perspective view of the valve shown in FIG. 7, but shown in a locked closed valve position.

Normally, when unlocked, the upper slide plate 150 is in the position as illustrated in FIG. 12 (with the valve in an open position) or FIG. 14 (with the valve in a closed position). When, however, it is desired to lock the valve in either of those positions, pressing downwardly on a single slide member may not allow the aperture, such as aperture 31 the first embodiment, to extend downwardly sufficiently to align with the mating apertures in the top valve plate. In order to compensate for variations in the distance between base plate 20 and the valve body 12, the embodiment of the slide members of FIGS. 7-14 is employed. With the embodiment shown in FIGS. 7-14, however, the upper plate 150 can slide along slot 142 and compress spring 170 once tines 144 and 146 bottom out on base valve body 12. This allows the upper plate 150 to move downwardly an additional distance defined by the length of the vertically extending leg 141 of slot 142 to align lock-receiving apertures 42 and 152 and accommodate different diameter valve bodies. This, in effect, provides a compressible locking slide 150. FIGS. 12 and 13 show the valve in an unlocked open position and an unlocked closed position, respectively. FIGS. 7 and 8, on the other hand, show the locking assembly 130 and the valve in an open locked position. FIG. 14 shows the valve in a closed locked position.

It will become apparent to those skilled in the art that various modifications to the preferred embodiment of the invention as described herein can be made without departing from the spirit or scope of the invention as defined by the appended claims.

The invention claimed is:

1. A valve locking system comprising:
 a valve body having a valve stem coupled to a fluid control element movable by a valve handle coupled to said valve stem, said valve body including at least one tab for defining a predetermined position of said fluid control element and wherein said handle includes a locking member;
 a base plate mounted to said valve body and to said valve stem to selectively engage said tab on the valve body to position said fluid control element at said predetermined position; and
 a locking slide plate which extends through said base plate in an axial direction parallel to and offset from the axis of said valve stem to selectively engage said tab on said valve body, said locking slide plate also extending through the valve handle and through said locking member to selectively lock said valve in said predetermined position.

2. The valve locking system as defined in claim 1 wherein said locking slide plate has spaced-apart tines at one end which can selectively span said tab on the valve body for holding said valve in said predetermined position.

3. The valve locking system as defined in claim 2 and further including a bias spring which urges said tines of said locking slide plate away from said tab toward an unlocked position.

4. The valve locking system as defined in claim 1 wherein said locking slide plate comprises two sections including a lower section having spaced-apart tines which selectively engage said tab on said valve body and an upper section which is spring-biased to the lower section to float to allow the lower section to accommodate different diameter valve bodies and allow the upper section to move to a locking position with respect to said locking member.

5. The valve locking system as defined in claim 1 wherein an end of said locking slide plate remote from said valve body includes an aperture which aligns with an aperture in said locking member of said valve handle when the locking slide plate is moved to engage said tab, such that a lock can be inserted between said locking slide plate and said locking member to lock the valve in a selected position.

6. The valve locking system as defined in claim 5 wherein said locking member includes an upper valve plate attached to said handle, said plate having a slot through which said locking slide plate extends and a side wall including said aperture.

7. A valve locking system comprising:
 a valve body having a valve stem coupled to a fluid control element movable by a valve handle coupled to said valve stem, said valve body including a pair of spaced-apart tabs defining open and closed positions of said fluid control element and wherein said valve handle includes a locking member;
 a base plate mounted to said valve body and to said valve stem to selectively engage said tabs on the valve body to position said fluid control element at said open and closed positions;
 a valve handle extension extending from said handle to said base plate for moving said fluid control element with movement of said valve handle; and
 a locking slide plate which extends through said base plate in an axial direction parallel to and offset from the axis of said valve stem to selectively engage said tabs on said valve body, said locking slide plate also extending through the valve handle and through said locking member to selectively lock said valve in open and closed positions.

8. The valve locking system as defined in claim 7 wherein said locking slide plate has spaced-apart tines at one end which can selectively span said tabs on the valve body for holding said valve in a selected one of said predetermined positions.

9. The valve locking system as defined in claim 8 and further including a bias spring which urges said tines of said locking slide plate away from said tabs toward an unlocked position.

10. The valve locking system as defined in claim 7 wherein said locking slide plate comprises two sections including a lower section having spaced-apart tines which selectively engage said tabs on said valve body and an upper section which is movably coupled to said lower section and spring-biased to the lower section to float to allow the upper section to move to a locking position with respect to said locking member.

11. The valve locking system as defined in claim 10 wherein an end of said locking slide plate remote from said valve body includes an aperture which aligns with an aperture in said locking member of said valve handle when the locking slide plate is moved to engage one of said tabs, such that a lock can be inserted between said locking slide plate and said locking member to lock the valve in a selected position.

12. The valve locking system as defined in claim 7 wherein an end of said locking slide plate remote from said valve body includes an aperture which aligns with an aperture in said locking member of said valve handle when the locking slide plate is moved to engage one of said tabs, such that a lock can be inserted between said locking slide plate and said locking member to lock the valve in a selected position.

13. The valve locking system as defined in claim 12 wherein said locking member includes an upper valve plate attached to said handle, said plate having a slot through which said locking slide plate extends and a side including an aperture for receiving a lock.

14. A valve locking system comprising:
  a ball valve having a valve stem and a handle and a top valve plate coupled to said handle;
  a valve handle extension coupled to said handle and extending toward said body of said valve, said valve body including a pair of spaced-apart tabs defining open and closed positions of said valve;
  a base plate mounted to said valve body and to a valve stem of said body, said base plate coupled to said extension to selectively engage said tabs on said valve body to position said ball valve at said open and closed positions; and
  a locking slide plate which extends through said top valve plate and said base plate in an axial direction parallel to and offset from the axis of said valve stem to selectively engage said tabs on said valve body to selectively lock said ball valve in open or closed positions.

15. The valve locking system as defined in claim 14 wherein said locking slide plate has spaced-apart tines at one end which can selectively span said tabs on the valve body for holding said valve in a selected open or closed position.

16. The valve locking system as defined in claim 15 and further including a bias spring which urges said tines of said locking slide plate away from said tabs toward an unlocked position.

17. The valve locking system as defined in claim 14 wherein said locking slide plate comprises two sections including a lower section having spaced-apart tines which selectively engage said tabs on said valve body and an upper section which is movably coupled to said lower section and spring-biased to the lower section to float to allow the lower section to accommodate different diameter valve bodies and allow the upper section to move to a locking position with respect to said top valve plate.

18. The valve locking system as defined in claim 17 wherein an end of said locking slide plate remote from said valve body includes an aperture which aligns with an aperture in said top valve plate when the locking slide plate is moved to engage one of said tabs, such that a lock can be inserted between said locking slide plate and said top valve plate to lock the valve in a selected position.

19. The valve locking system as defined in claim 14 wherein an end of said locking slide plate remote from said valve body includes an aperture which aligns with an aperture in said top valve plate when the locking slide plate is moved to engage one of said tabs, such that a lock can be inserted between said locking slide plate and said top valve plate to lock the valve in a selected position.

20. The valve locking system as defined in claim 14 wherein said extension is a cylindrical sleeve.

\* \* \* \* \*